United States Patent
Drury et al.

(10) Patent No.: US 9,255,036 B2
(45) Date of Patent: Feb. 9, 2016

(54) CELLULAR CERAMIC ARTICLE AND METHOD FOR MANUFACTURING THE SAME

(71) Applicant: Corning Incorporated, Corning, NY (US)

(72) Inventors: Kenneth Joseph Drury, Big Flats, NY (US); Paul John Shustack, Elmira, NY (US); Todd Parrish St. Clair, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 59 days.

(21) Appl. No.: 13/834,415

(22) Filed: Mar. 15, 2013

(65) Prior Publication Data

US 2014/0272276 A1    Sep. 18, 2014

(51) Int. Cl.

| | |
|---|---|
| *B29D 24/00* | (2006.01) |
| *B01D 53/94* | (2006.01) |
| *C04B 38/00* | (2006.01) |
| *C04B 41/45* | (2006.01) |
| *B05D 7/22* | (2006.01) |
| *C04B 41/83* | (2006.01) |
| *C04B 41/00* | (2006.01) |
| *C04B 41/48* | (2006.01) |
| *C04B 111/00* | (2006.01) |
| *C04B 111/27* | (2006.01) |

(52) U.S. Cl.
CPC ............ *C04B 38/0003* (2013.01); *B01D 53/94* (2013.01); *B05D 7/22* (2013.01); *B29D 24/005* (2013.01); *C04B 38/00* (2013.01); *C04B 38/0006* (2013.01); *C04B 38/0012* (2013.01); *C04B 41/009* (2013.01); *C04B 41/45* (2013.01); *C04B 41/483* (2013.01); *C04B 41/83* (2013.01); *C04B 2111/0081* (2013.01); *C04B 2111/00793* (2013.01); *C04B 2111/27* (2013.01); *Y10T 428/24149* (2015.01)

(58) Field of Classification Search
None
See application file for complete search history.

(56) References Cited

U.S. PATENT DOCUMENTS

| | | | |
|---|---|---|---|
| 7,556,664 B2 | 7/2009 | Ichikawa et al. | 55/523 |
| 8,475,557 B2 * | 7/2013 | Boger | C04B 41/4578 422/169 |
| 2005/0159308 A1 | 7/2005 | Bliss et al. | 502/439 |
| 2006/0121266 A1 * | 6/2006 | Fandel | B01J 27/224 428/312.6 |
| 2007/0292657 A1 * | 12/2007 | Sorensen | C04B 41/009 428/116 |
| 2008/0057234 A1 | 3/2008 | Custer et al. | 428/34.4 |
| 2009/0142488 A1 | 6/2009 | Cutler et al. | 427/243 |
| 2009/0202718 A1 | 8/2009 | Cutlet et al. | 427/230 |
| 2010/0052200 A1 * | 3/2010 | Deneka | C04B 35/478 264/44 |
| 2012/0047860 A1 | 3/2012 | Boger et al. | 55/523 |

FOREIGN PATENT DOCUMENTS

| | | |
|---|---|---|
| WO | 2010099387 | 9/2010 |
| WO | 2013152071 | 10/2013 |

OTHER PUBLICATIONS

Nov. 28, 2014 International Search Report application No. PCT/US2014/025779.

* cited by examiner

*Primary Examiner* — William Phillip Fletcher, III
(74) *Attorney, Agent, or Firm* — Charles A. Greene

(57) ABSTRACT

A method and apparatus to treat a dried unfired article comprising a ceramic precursor composition substantially held together by a binder, to be resistant to binder soluble solvent based processing. The method includes depositing a fluid on the article surface, and polymerizing the deposited fluid to form a polymer thin layer on the surface. The fluid may be an aerosol, a vapor, a fog, a mist, a smoke, or combinations thereof. An apparatus to perform the method and an article resistant to binder soluble solvent based processing are also provided. The article can be an unfired honeycomb body that includes a dried composition of ceramic precursor substantially held together by a binder and a layer disposed on a surface of the unfired honeycomb body. The surface to be exposed in the green state to a binder soluble solvent and the layer protects the binder from solubilization by the solvent.

20 Claims, 12 Drawing Sheets

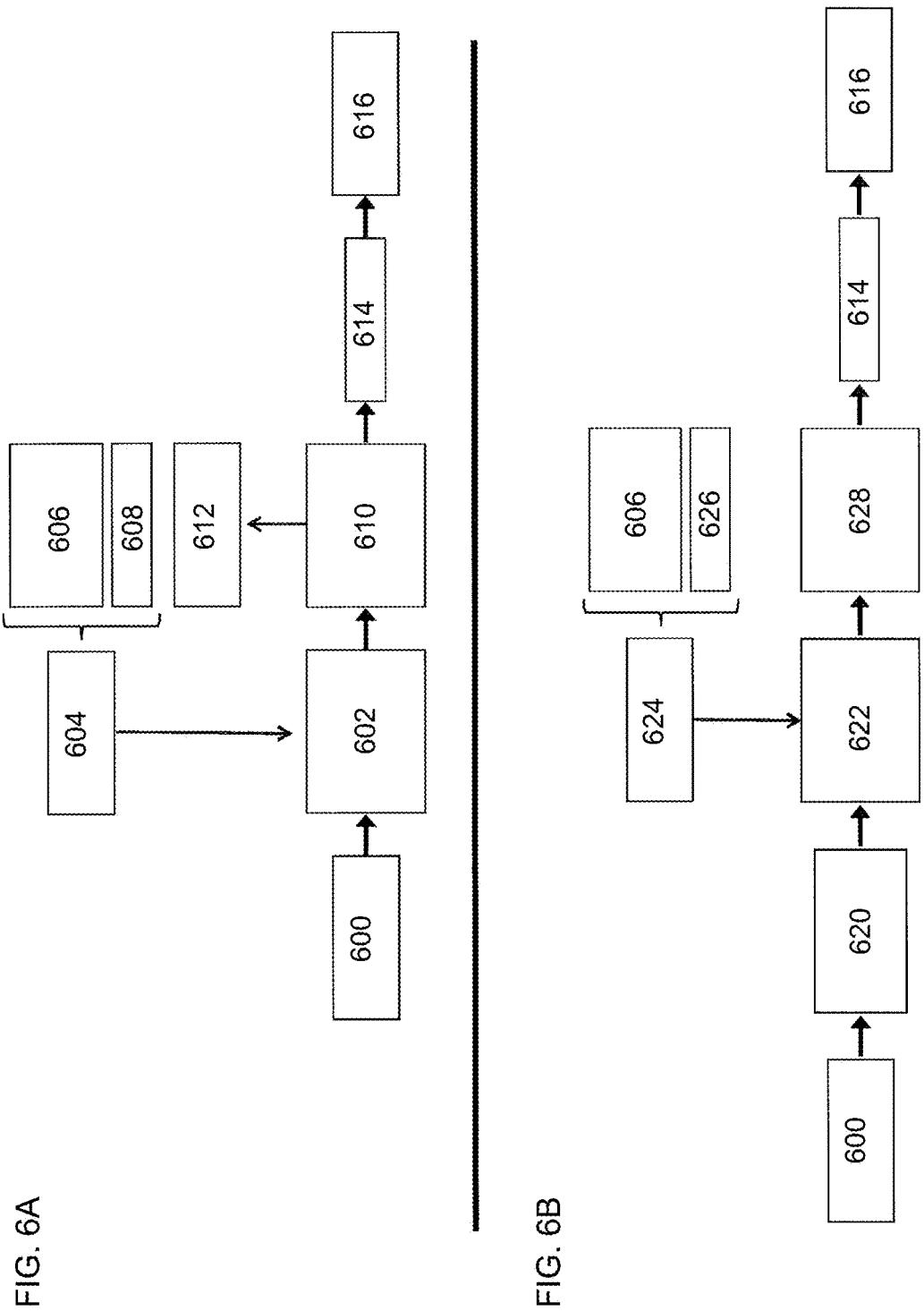

CELLULAR CERAMIC ARTICLE AND METHOD FOR MANUFACTURING THE SAME

BACKGROUND

1. Field

Exemplary embodiments of the present disclosure relate to methods and apparatus to treat green cellular ceramic articles containing a binder to enable binder soluble solvent processing, and articles comprising the same.

2. Discussion of the Background

Diesel particulate filters and catalyst substrates made of extruded honeycomb ceramics are key components in modern engine after treatment systems designed to meet current and future emission legislation. Cordierite is currently the dominant material of choice for substrates and is used for diesel particulate filters as well, especially for heavy-duty applications. Cordierite-based filters are also considered for gasoline particulate filters, should future emission standards require the need for such. Other material choices include stabilized aluminum titanate (AT) and silicon carbide (SiC), either re-crystallized or Si-bonded.

Such products are typically manufactured by an extrusion process followed by drying and high temperature thermal treatment processes (firing). For filters, an additional step is required to plug honeycomb channels. Cordierite and aluminum titanate honeycombs are synthetic ceramics for which the extrusion batch primarily comprises precursor materials such as alumina, silica, titania, etc. that react during the firing step to form the finished ceramic. Additional components are added to adjust rheological properties and to aid formation of pores with the desired structure. As the final material is obtained only after chemical reaction of the raw materials during the high temperature thermal treatment, prior to that treatment, the honeycomb structures and batch material are usually referred to as being in the "green" state.

In addition to possible material differences, the honeycomb structures used today for filters and substrates also differ in the number of cells per unit area, typically expressed as cells per square inch (cpsi), the web thickness, and the porosity characteristics of the wall material, namely porosity and pore size distribution. Extruded products commercially manufactured today have essentially uniform porosity and pore size distribution along the wall from inlet to outlet face and across the webs from one channel to the adjacent channel, with the porous characteristics determined primarily by the composition of the green batch and the subsequent thermal treatment steps. Furthermore, such products have essentially constant web thickness from inlet to outlet, as determined by the dimensions of the extrusion die. In contrast, products with varying web thickness in the radial direction to increase mechanical strength, i.e. the web thickness increases from the center to the skin, are commercially available. This variability is typically designed through different slot sizes of the extrusion die and again does not change along the main axis of the part.

For applications requiring only a substrate (where no channels are plugged as they are in diesel particulate filters), a catalytically active material is disposed on the substrate, typically via a washcoating process. In this process, the catalytically active material is applied in the form of a slurry, with the catalyst materials being dispersed and dissolved therein. Driven by a slip casting effect, the catalyst particles are deposited primarily onto the geometric surface of the substrate with some portion actually penetrating into the substrate pore structure and acting as anchors to provide good adhesion between the coating and substrate walls. To increase the degree of adhesion, a web surface with high porosity and a tailored pore size is desirable. However, to prevent excessive penetration of the coating into the wall, where the catalyst utilization would be lower due to diffusion limitations, a web surface with lower porosity and finer pores is desirable. In addition, a very low porosity substrate has an advantage in mechanical strength.

In the case of soot filtration inside a so-called wall flow filter, as used on diesel engines today, the pressure drop increases as soot becomes trapped in the filter walls. This is undesirable from both engine operation and fuel economy perspectives. To manage the overall pressure drop of the system the filter is frequently exposed (regenerated) to conditions during which the accumulated carbon-based matter is oxidized. In general, pressure drop is determined by the geometry of the honeycomb in terms of hydraulic diameter of the channels, open area for flow and web thickness and geometric or filtration area. In addition, in the presence of soot the pressure drop increases due to the amount of soot that penetrates into the microstructure (deep bed filtration) as well as the amount of soot that accumulates on the filter wall surface (cake filtration). Due to flow restrictions in the porous wall and higher specific velocities, the impact of deep bed soot (deposited inside the porous wall) on pressure drop is significantly more pronounced compared to soot deposited as cake. It has been observed that this effect is reduced when the pore size is reduced, typically below a mean pore size of ~10 nm. A drawback to decreasing the pore size is that the wall permeability, even without soot, decreases proportionally to the square of the pore size and linearly with wall thickness. Accordingly, a thin surface layer with both small pore size and high porosity supported by a substrate with large pore size and high porosity would serve to address at least some of these concerns.

As described above, the increase in pressure drop with accumulation of soot requires frequent regeneration of the filter and removal by oxidation of the accumulated soot. Under certain conditions, referred to as uncontrolled regeneration, the heat release during this oxidation step can be significant, resulting in an increase in the temperature inside the filter. In extreme cases, this can lead to filter damage due to thermal stresses or even melting. For filter materials, a strong correlation between the volumetric heat capacity (bulk density×specific heat capacity) and the peak temperature observed during extreme soot regeneration events has been found. For high values of the volumetric heat capacity, lower temperatures are observed. As a result, for a given material with a given specific heat capacity (J/kgK) and a given maximum temperature, a higher bulk density is required for increased soot mass limit. The latter can be achieved by either using a lower porosity material or designing a filter with lower open channel volume, i.e. thicker webs. In filter applications, the highest temperatures are usually observed at the filter exit, so having a higher density at the exit would mitigate the increases in temperature. With respect to pressure drop, however, filters with higher porosity and thinner walls are desirable. Analogous to the tradeoff described above for substrates, the filter designs must be optimized to balance these opposing characteristics, however such designs have not been shown to be economically obtained via a continuous extrusion process.

Catalytically active materials are now being coated not only on substrates but on some filters as well. The catalytic coating of plugged particulate filters typically is found inside the porous wall structure. This is in many cases desirable from a permeability perspective and often driven by the coating process in which the slurry is forced to flow through the walls due to the alternate plugging pattern of the filter channels. A common limitation is that any separation of catalyst functionality, i.e. due to the presence of more than one type of catalytic active material, across the web or wall is technically difficult to achieve. Having an asymmetric pore structure with small pores on one side of the wall would help to sieve/slip-cast the catalyst particles of a slurry applied from this side of the wall, preventing substantial penetration into the pore structure. An additional catalyst material could be applied from the other side of the web with resulting deposition for example into the porous wall structure. With current filter products of homogenous pore size and pore structure across the web, this is challenging at best, if not impossible.

The above application examples, although not exhaustive, demonstrate the need for substrate and filter substrate bodies with webs that have different properties either along the web from inlet to outlet face or across the web from one channel to the adjacent channels. However, such designs cannot be obtained in an economically viable manner via the continuous extrusion process. Existing methods to generate structures with such variability on a web scale are based on applying a slurry, analogous to the catalyst coating process described above, to the fired substrate body. These methods, however, require additional thermal treatment steps, generally create an interface with different thermo-mechanical properties that will result in thermal stresses, and have lower permeability as the pore structures are not continuous but rather in separate layers. The latter can be addressed to some extent by using a multitude of layers with a gradient in properties but this comes at a high manufacturing cost.

The above information disclosed in this Background section is only for enhancement of understanding of the background of the invention and therefore it may contain information that does not form any part of the prior art nor what the prior art may suggest to a person of ordinary skill in the art.

SUMMARY

Exemplary embodiments of the present disclosure provide a method to treat a dried unfired article comprising a ceramic precursor composition substantially held together by a binder, to be resistant to binder soluble solvent based processing.

Exemplary embodiments of the present disclosure also provide an apparatus to treat a dried unfired article comprising a ceramic precursor composition substantially held together by a binder, to be resistant to binder soluble solvent based processing.

Exemplary embodiments of the present disclosure also provide a dried unfired article comprising a ceramic precursor composition substantially held together by a binder, the article treated to be resistant to binder soluble solvent based processing.

Exemplary embodiments of the present disclosure also provide a cellular ceramic article fired from the dried unfired article comprising a ceramic precursor composition substantially held together by a binder, the article treated to be resistant to binder soluble solvent based processing.

Additional features of the claimed invention will be set forth in the description which follows, and in part will be apparent from the description, or may be learned by practice of the claimed invention.

An exemplary embodiment discloses a method of manufacturing a cellular ceramic article. The method includes providing a green cellular ceramic body comprising a binder material and a plurality of channels. The method includes exposing a surface of the green cellular ceramic body to a fluid to deposit at least a portion of the fluid on the surface, and polymerizing the deposited fluid to form a polymer thin layer on the surface. The method includes post processing the surface of the of the green cellular ceramic body with a green processing composition and a solvent to form a green component on the polymer thin layer, wherein the binder material is soluble in the solvent.

An exemplary embodiment also discloses a green cellular ceramic body that includes a binder material, a plurality of channels, and a polymer layer disposed on a surface of the green cellular ceramic body. A green component is disposed on the polymer thin layer, the green component having a ceramic powder, a liquid vehicle, and a liquid vehicle-soluble temporary binder, wherein the binder material of the green cellular ceramic body is soluble in the liquid vehicle and the polymer layer forms a barrier to at least partially protect the binder from the liquid vehicle.

An exemplary embodiment also discloses a cellular ceramic article fired from the green cellular ceramic body.

An exemplary embodiment also discloses an apparatus configured to treat a dried unfired article comprising a ceramic precursor composition substantially held together by a binder, to be resistant to binder soluble solvent based processing. The apparatus includes a fluid generator to generate a fluid, the fluid generator configured to convey the fluid, and an article holder configured to hold a dried unfired article comprising a ceramic precursor composition substantially held together by a binder, to receive the fluid from the fluid generator, to expose a surface of the article to the fluid from the fluid generator to deposit at least a portion of the fluid on the surface, and polymerize the deposited fluid to form a polymer thin layer on the surface.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the claimed invention and are incorporated in and constitute a part of this specification, illustrate exemplary embodiments of the disclosure, and together with the description serve to explain the principles of the claimed invention.

FIG. 6A is a schematic flow chart diagram of a method for applying a coating to green ware and FIG. 6B is a schematic flow chart diagram of a method for applying a coating to treated green ware according to an exemplary embodiment of the disclosure.

DETAILED DESCRIPTION OF THE ILLUSTRATED EMBODIMENTS

Figure 1:
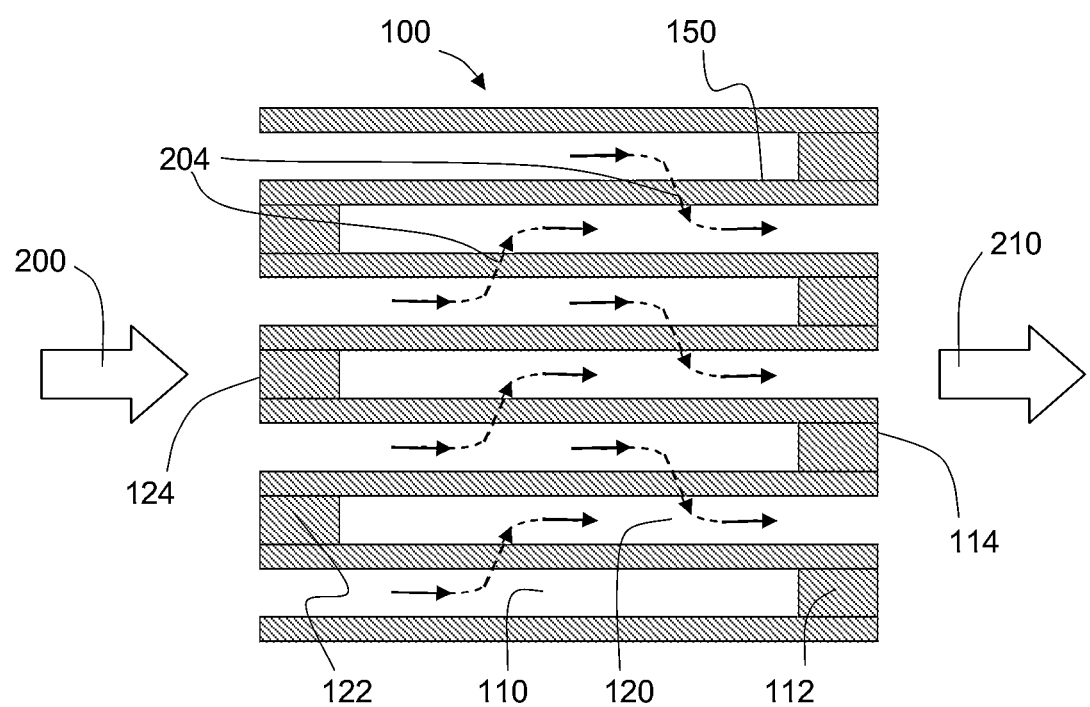
FIG. 1 illustrates a cross-sectional representation of a wall-flow filter structure.

The disclosure is described more fully hereinafter with reference to the accompanying drawings, in which exemplary embodiments are shown. The claims may, however, be embodied in many different forms and should not be construed as limited to the embodiments set forth herein. Rather, these embodiments are provided so that this disclosure is thorough, and will fully convey the scope of the claims to those skilled in the art. In the drawings, the size and relative sizes of layers and regions may be exaggerated for clarity. Like reference numerals in the drawings denote like elements.

It will be understood that when an element is referred to as being "on" or "connected to" another element, it can be directly on or directly connected to the other element, or intervening elements may be present. In contrast, when an element is referred to as being "directly on" or "directly connected to" another element, there are no intervening elements present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

As used herein, the term "soluble" refers to a first medium (e.g., solute) having a solubility in a second medium (e.g., solvent) of at least 0.1 mole per liter at 25° C.

As used herein, the term "insoluble" refers to a first medium (e.g., solute) having a solubility in a second medium (e.g., solvent) of less than 0.001 mole per liter at 25° C.

As used herein, the term "partially soluble" refers to a first medium (e.g., solute) having a solubility in a second medium (e.g., solvent) of at least 0.001 mole per liter but less than 0.1 mole per liter at 25° C.

For example, "the binder is insoluble in the liquid vehicle" when the binder has a solubility limit in the liquid vehicle at 25° C. of less than 0.001 mole per liter.

As used herein, the term "partially plugged", in the case of either a green cellular ceramic body or a ceramic article, means that the green cellular ceramic body or ceramic article has at least some channels plugged on a first end and less than the intended number of channels to be plugged in the final product plugged on the second end. Partially plugged green cellular ceramic bodies and partially plugged ceramic articles include those having at least some channels plugged on a first end and no channels plugged on a second end.

It will be understood as used herein the term "green cellular ceramic" for the purposes of this disclosure can be construed as a dried unfired article comprising a ceramic precursor material substantially held together by a binder. Additional components may be present in the ceramic precursor (batch) to adjust rheological properties and to aid formation of pores with the desired structure. As the final material is obtained only after chemical reaction of at least some of the raw materials during the high temperature thermal treatment, prior to that treatment, the honeycomb structures and batch material may be referred to as being in the "green" state and the article as "green ware". While not required in all aspects, the chemical reaction of the raw materials during the high temperature thermal treatment described herein includes sintering of particles to each other where the particles may maintain their original composition, as well as reactions where the raw materials are completely reacted, to form the final material.

According to exemplary embodiments of the disclosure a process for tailoring the properties of porous cellular ceramic articles is provided. The process includes treating a green cellular ceramic (green ware) to form a thin layer on surfaces of the green ware, the thin layer composition may be tailored depending on the solubility of green binders used in the material batch, where the treatment enables subsequent processing of the green cellular ceramic. The treated and processed green ware may subsequently be fired to convert the processed green cellular ceramic to a porous ceramic filter. For example, the treatment may include covering the green cellular ceramic surfaces with an acrylate to render the substance hydrophobic when the green binders are water soluble. As another example, the treatment may include covering the green cellular ceramic surfaces to convert the surfaces from oleophilic to oleophobic when oil-soluble green binders are used. The treatment may dispose a thin polymer layer on the surfaces of the green cellular ceramic. The process may include applying a thin green coating to the walls of the treated green cellular ceramic and subsequently firing the coated ware to convert both the coating and the wall to a porous ceramic filter while volatilizing the thin polymer layer.

The process also may include before firing applying a green skin to the treated periphery of the green cellular ceramic and subsequently firing the treated and coated ware to convert both the skin and the green cellular ceramic to a porous ceramic filter. The process also may include before firing applying green plugs to channels of the treated green cellular ceramic and subsequently firing the treated plugged ware to convert the plugs and the treated green cellular ceramic to a porous ceramic filter while volatilizing the thin layer.

The green cellular body may be an extruded honeycomb comprising inorganic precursors, organic and inorganic binders, pore formers, oil, and water. The green coating, skin, and plugs may be a mixture of a suitable liquid vehicle, selected from among liquids that may or may not compromise the green substrate body, inorganic precursors and optional pore formers. Examples of suitable liquid vehicles include water, oils, alcohols having acceptable properties, such as an acceptable degree of hydrophobicity and volatility, although other suitable liquids can also be used. The other inorganic and organic raw materials of the green coating, skin, and plugs can be similar in nature or identical to those used in the making of the green substrate body. In addition, similar technical approaches can be applied to tailor the properties of the coating, such as for example its pore size and porosity. When the green coating, skin, and/or plugs and substrate are fired, the thin polymer layer, precursors and pore formers present in these components may react and/or burn off, leading to a porous ceramic body with a well-connected solid phase.

Honeycomb structures formed from ceramic materials have a number of important uses including use as catalyst supports for controlling emissions from combustion engines and stationary pollutions sources such as power plants. They are also used as porous particulate filter bodies for the filtration of particulate-laden exhaust gases emitted by combustion engines such as diesel engines. In the latter case, the bodies are modified through the sealing or plugging of the ends of selected cells of the honeycombs to provide a manifolded "wall-flow" filter structure. A cross-sectional representation of such a "wall-flow" filter structure is shown in FIG. 1.

The fabrication of such filters typically involves plugging or otherwise sealing one end of each of the channels or cells traversing a porous ceramic honeycomb body 100, a first subset of channels or cells (i.e., "inlet channels") 110 being sealed or plugged 112 at a first or outlet end face 114 of the honeycomb and the remaining channels or cells (i.e., "outlet channels") 120 being sealed or plugged 122 at a second or opposing inlet end face 124 thereof. A particulate-contaminated fluid such as an exhaust gas 200 is supplied under pressure to the inlet face and enters the body via those cells which have an open end at the inlet end face 124. Because these cells are sealed at the opposite end face (outlet end face 114) of the body, the contaminated fluid is forced through the thin, porous walls 150 into adjoining cells (through-wall flow 204) which are sealed at the inlet end face 124 and open at the outlet end face 114. The solid particulate contaminant in the fluid which is too large to pass through the porous openings in the walls is left behind and a cleansed fluid 210 exits the filter body through the outlet cells for use. Most common in the case of honeycombs with square channel cross-sections is a masking design producing a checkerboard pattern of plugs in each end of the honeycombs, such that each inlet cell is surrounded on four sides by outlet cells, and vice versa.

As coating is applied in the green state, while the walls of the green ware have low porosity with small diameter compared to a fired body, formation of at least two relatively discrete regions across the wall can be formed, one determined by the green composition of the substrate material and the other determined by the green composition of the coating. A higher number of regions can be observed if, for example, both sides of the channel wall are coated or if multiple coatings of different composition are applied. Because the reaction preferably occurs simultaneously with sintering, all regions are enabled to be well-connected and continuous in terms of the solid phase. The pore space in both regions can also be very well connected, as the gaseous products from the pore forming additives have to escape through the coating layer.

Spatial properties of the resulting fired coated ceramic can be significantly altered by the selection of the composition of the green coating. For example, through suitable selection of particle size and batch materials, coatings with higher or lower pore size and/or porosity or even different chemical composition compared to the base substrate material region can be formed. Adding the coating in the green state cannot only improve the properties and uniformity of this coating, but can also significantly decrease the cost and complexity in manufacturing inorganic membranes for at least the reason that only a single firing step is required. In comparison, conventional methods for manufacturing inorganic membranes typically consist of multiple coating, drying and firing steps.

Providing monolithic substrate materials with properties that vary either across the wall or along the wall can address one or more problems found today in many applications. For example, the formation of a thin surface layer with smaller pore size and equal or higher porosity than the bulk wall may result in a beneficial decrease in deep bed filtration and a reduction in soot loaded pressure drop of a diesel particulate filter (DPF). In addition, such a layer may increase the filtration efficiency with minimal effect on backpressure. This thin surface layer can also facilitate the deposition of an on-wall catalytic coating for a DPF. The formation of a surface layer whose properties (porosity, pore size, and/or thickness) vary along the filter length could also be provided. For example, a filter whose wall thicknesses increased along the length could have reduced thermal axial gradients. Other examples for substrates include cases where a low porosity, high strength substrate is coated with a thin layer of higher porosity, pore size and surface roughness to increase adhesion of a catalyst coating applied to it.

When a percentage increase or decrease is disclosed herein, the percentage increase or decrease is to be understood as being relative to the size of the un-increased or decreased parameter being referenced. For example, if a wall or channel being coated by a coating layer has a surface porosity of 30%, the statement "the surface porosity of the coating layer is at least 5% greater than the surface porosity of a wall on the channel on which it is coated" is to be understood as describing a coating layer having a surface porosity of at least 1.05×30% and not at least 35%.

Figure 2A:
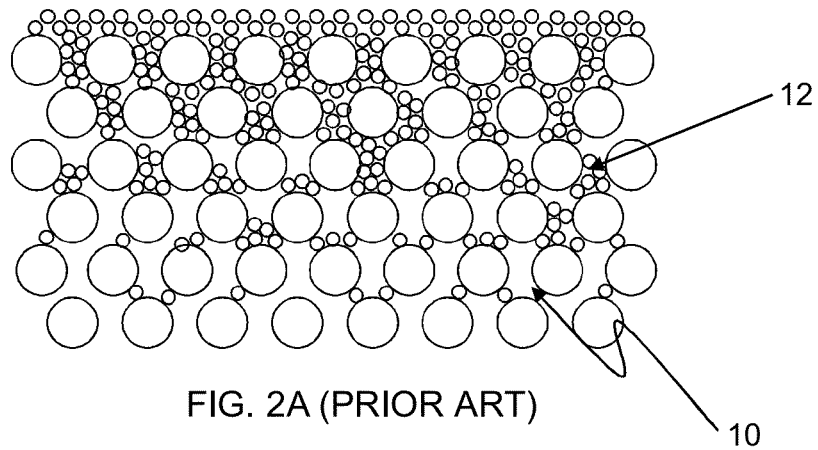
FIGS. 2A and 2B schematically illustrate coating a coating composition onto the walls of fired ware as opposed to FIG. 2C that schematically illustrates coating a coating composition onto the walls of green ware and FIG. 2D that schematically illustrates coating a coating composition onto the walls of green ware treated with a thin layer according to exemplary embodiments of the disclosure.

Embodiments disclosed herein provide a process applied to green cellular ceramics that can modify particular properties in the resulting fired ware. Articles made by this process can also be provided. Coating, plugging and/or skinning green ware can have one or more advantages when compared to coating, plugging and/or skinning fired ware, particularly when the fired ware is substantially porous. A common problem with coating fired ware is that the particles that make up the coating can penetrate into the substrate if the pores are large enough. The challenge with this approach is illustrated schematically in FIG. 2A, where the particles 12 from the coating penetrate into the substrate pore structure 10, significantly decreasing the overall wall permeability.

Figure 2B:
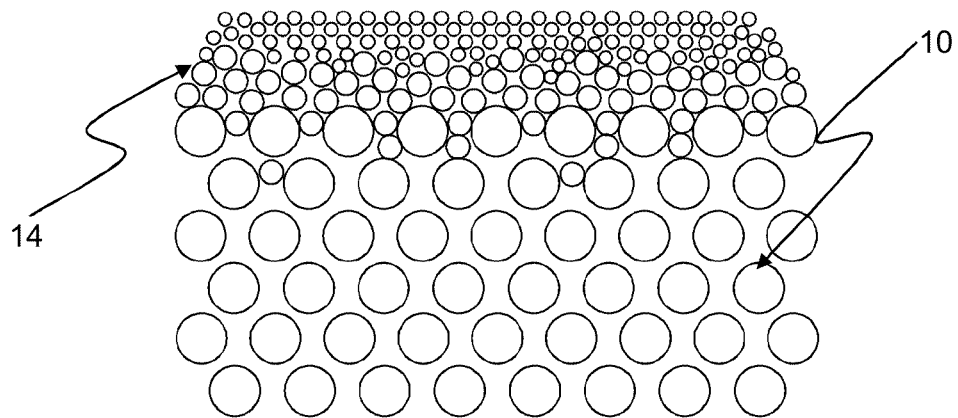

The conventional solution to this problem is to decrease the particle sizes stepwise in layers wherein smaller particles 12 are layered over larger particles 14, as shown in FIG. 2B, such that limited penetration occurs during any coating step. The material stack culminates in a top layer where the particle size and sintering conditions are chosen to achieve the final pore size and porosity. Each of the coating steps are typically performed at least twice to ensure that a continuous layer with the smaller particles is formed before the next smaller size particles are deposited. However, in the case of ceramic materials, this is an extremely costly process approach as multiple coating, drying, and (high temperature) firing steps are required.

Figure 2C:
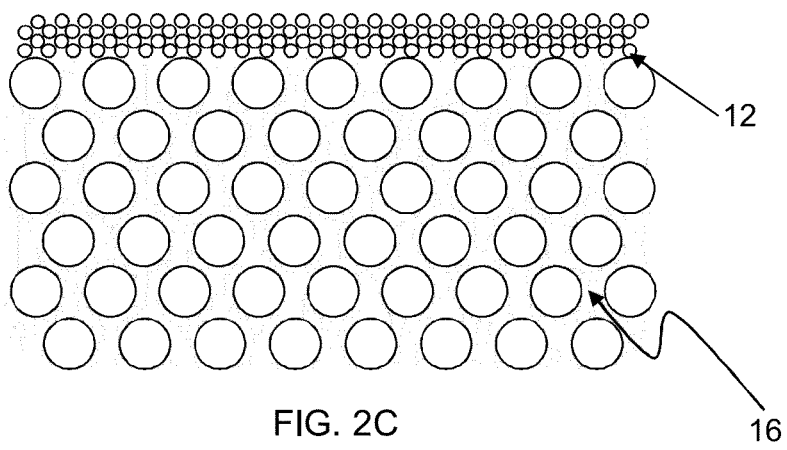

By coating relatively non-porous green ware 16, as shown in FIG. 2C, the particles 12 making up the slurry can be as small as desired since there is little-to-no porosity for the slurry to penetrate, resulting in a substantial decrease in cost and complexity of manufacturing. Another advantage is improved adhesion between the coating and the substrate because the ware and coating are both green and during firing the precursors react both within the coating and wall layers as well as across the interface to form the final product. Yet another advantage is that the coating that is formed is an on-wall coating, as the green ware typically has low porosity and very small pore diameter. This enables its use as a barrier layer, which may be very useful for forming on-wall catalyst coatings among other applications.

The solvent vehicle for the inorganic and pore former phases for the arrangement of FIG. 2C should be chosen such that the binder material in the green ware walls, for example, methylcellulose, is insoluble in the solvent. For example, if an aqueous-based slurry is used to apply a coating, the water in the slurry will dissolve some of the methylcellulose binder from the wall. This point is illustrated in co-pending U.S. patent application Ser. No. 13/219,016, the entire contents of which is hereby incorporated by reference as though fully set forth herein, where slurries containing five different solvents were prepared and applied to cellular green ware. The first two solvents were alcohols, specifically butanol and isopropyl alcohol (IPA). The next three solvents were alcohol-water mixtures, specifically, isopropyl alcohol and 10% water, isopropyl alcohol and 25% water, and isopropyl alcohol and 50% water. As the water content of the solvent is increased, the weight loss of the green ware in wt % per hour is also increased, which can lead to a significant weakening of the ultimate product.

Accordingly, exemplary embodiments of the disclosure provide a method of manufacturing a cellular ceramic article that includes providing a green cellular ceramic body, the green cellular ceramic body comprising a binder material and a plurality of channels. The method also includes treating at least one of the plurality of channels with a thin polymer layer and coating the treated at least one channel with a slurry comprising a green coating composition and a solvent to form a coating layer on at least one of the plurality of channels. The binder material may be soluble or insoluble in the solvent. However, the thin layer protects the binder from the solvent. In addition, the at least one of the plurality of channels may be unplugged when coated with the slurry.

Figure 2D:
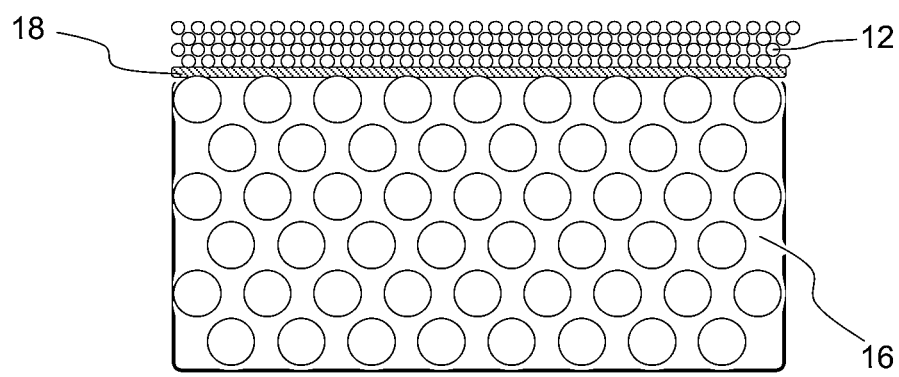

FIG. 2D schematically illustrates coating a coating composition onto the walls of green ware treated with a thin layer according to exemplary embodiments of the disclosure. In FIG. 2D a thin layer 18 is disposed on the non-porous green ware and the particles 12 making up the slurry can be as small as desired since there is little-to-no porosity for the slurry to penetrate, resulting in a substantial decrease in cost and complexity of manufacturing. In addition, the slurry may comprise any solvent vehicle for the inorganic and pore former phases since the binder material in the green ware walls, for example, methylcellulose, is protected from being solubilized. That is, the thin layer 18 provides a barrier to prevent the slurry solvent from dissolving the binder material. Accordingly, aqueous solvents may be used according to exemplary embodiments of the disclosure even when the binder material includes methylcellulose.

According to exemplary embodiments of the disclosure, a process by which the substrate can be rendered hydrophobic to enable water based post processing (coating, plugging, skinning, and the like) of green substrates is provided. Furthermore, the substrate can be rendered oleophobic to enable oil based liquid vehicle post processing of green substrates when the binder material is oil soluble. According to exemplary embodiments this processing may be applied to membrane technologies such as micro and ultrafiltration as well as green processing of membrane for diesel particulate filter (DPF), application of green plugs, green skin, or other green processing steps.

Suitable solvent components may include, for example, water, oils, alcohols, ester alcohols, esters, hydrocarbons, aldehydes, ketones, and carboxylic acids. Preferably, the solvent used in the slurry comprises water. Examples of alcohols that can be used as a solvent include methanol, ethanol, propanol, butanol, pentanol, and hexanol. An example of an ester alcohol that can be used is Texanol (2,2,4-Trimethyl-1,3-pentanediol monoisobutyrate) and an example of an ester that can be used is Optifilm Enhancer 300 (Propanoic acid, 2-methyl-, 1,1'-[2,2-dimethyl-1-(1-methylethyl)-1,3-propanediyl] ester), both sold commercially by Eastman Chemical Company. Examples of oils that can be used as a solvent include tall oil, oleic acid, light mineral oil, corn oil, high molecular weight polybutenes, polyol esters, a blend of light mineral oil and wax emulsion, a blend of paraffin wax in corn oil, and combinations of these.

The green coating composition used in the slurry preferably includes inorganic precursors. The choice of inorganic precursors is dependent upon the desired composition. For example, the green coating composition may comprise materials such as alumina, titania, silica, strontium carbonate, calcium carbonate, and/or lanthanum oxide. The materials selected for the green coating composition can be the same or different from those chosen to form the ceramic composition in the bulk wall of the green cellular ceramic body, for example a green cellular ceramic body in which aluminum titanate is the main phase and a feldspar is a secondary phase. Pore former may be optionally added to the green coating composition to generate coating porosity. Although the amount and type of pore former can be varied depending on the desired porosity, preferred embodiments of pore formers include, for example, starch derived from potato, rice, and/or corn at about, for example, 1-50 wt % super-addition.

As discussed above, the green cellular ceramic body can, in one or more embodiments, comprise materials that upon firing react to form aluminum titanate (AT). However, the green cellular ceramic body is not limited to materials that react to form AT and can comprise any materials or mixtures of materials that upon high temperature treatments react to form oxide or non-oxide ceramics, including metals, intermetallics, mullite, cordierite, alumina ($Al_2O_3$), zircon, alkali and alkaline-earth alumino-silicates, spinels, persovskites, zirconia, ceria, silicon carbide (SiC), silicon nitride ($Si_3N_4$), silicon aluminum oxynitride (SiAlON), and zeolites.

A preferred binder material in the green cellular ceramic body is a cellulose ether. Examples of preferred cellulose ethers include methylcellulose and hydroxypropyl methylcellulose, including the Methocel family of products available from the Dow Chemical Company. Preferred binder materials may also include polyols, such as polyvinylalcohol (PVA).

In one set of exemplary embodiments, the green cellular ceramic body and the green coating composition can have the same or essentially the same ingredients. In another set of exemplary embodiments, the green cellular ceramic body and the green coating composition can have at least some different ingredients. In yet another set of exemplary embodiments, the green coating composition can comprise two or more different coating compositions. For example, the green coating composition may comprise a first coating composition having the same or essentially the same ingredients as the green cellular ceramic body and a second coating composition having at least some different ingredients than the green cellular ceramic body. Alternatively, the green coating composition may comprise two or more coating compositions that each have at least some different ingredients than the green cellular ceramic body. The two or more coating compositions may be coated on different channels of the ceramic, such as a first coating composition on inlet channels and a second coating composition on outlet channels.

For example, the green coating composition may include at least one material that upon firing reacts to form at least one material selected from the group consisting of aluminum titanate (AT), metals, intermetallics, mullite, cordierite, alumina ($Al_2O_3$), zircon, alkali and alkaline-earth alumino-silicates, spinels, persovskites, zirconia, ceria, silicon carbide (SiC), silicon nitride ($Si_3N_4$), silicon aluminum oxynitride (SiAlON), and zeolites, which can be the same or different from the material of the green cellular ceramic body. It should be noted that if the green coating composition is different from that of the green cellular ceramic body it should preferably be thermodynamically stable with the green cellular ceramic body upon firing or at least be kinetically limited at the sintering temperature.

The green coating composition may also include a binder material. The binder material should preferably be selected to provide green strength to the coating after drying and should preferably be dispersible in any liquid vehicle used in the green coating composition. Preferred materials for the green coating composition binder material include colloidal boehmite (AlOOH), colloidal silica, colloidal titania, tetraethylorthosilicate (TEOS), tetramethylorthosilicate (TMOS), aluminum alkoxide, titanium alkoxide, and polyvinyl butyral, although any binder that is soluble or dispersable in the liquid vehicle may be used. Modification of the surface chemistry of colloidal binders such as boehmite or silica may be necessary to ensure good dispersion in the solvent of choice. It is important to note that when using a binder material that converts to inorganic material upon heating, the green slip chemistry should preferably be adjusted to account for this additional inorganic to achieve the desired fired chemistry (e.g., AT, mullite, etc.).

Prior to coating channels of the green cellular ceramic body with the slurry, the channels may be treated with an acrylate utilizing a misting process to deposit a thin layer on surfaces of the channels. The thin layer may convert the green substrate channel surfaces from hydrophilic to hydrophobic for aqueous based processing. That is, the thin layer imbues a resistance to the substrate that decreases dissolution of water-soluble extrusion binders. Misting may be utilized as described in U.S. Patent Application No. 2009/0202718 and U.S. Patent Application No. 2009/0142488, both of which are hereby incorporated by reference as though fully set forth herein, to deposit the thin layer. Furthermore, the thin layer composition can be selected depending on the solubility of green binders used in the material batch. For example, if oil-soluble binders are used in the material batch, then the green substrate surface could be converted from oleophilic to oleophobic to enable oil-based coatings to be applied. This approach teaches a flexible framework for combining varied binder chemistries with varied coating chemistries.

While misting is one approach that may be utilized to apply the hydrophobic treatment, another approach may be liquid based coating treatments. For liquid based coating treatments the coating material liquid vehicle would have to be compatible with the green substrate material. That is, the coating material liquid vehicle should not damage the green substrate containing a water soluble binder.

According to exemplary embodiments of the disclosure misting includes contacting a fluid and an unfired, extruded and dried ceramic precursor article (green ware), for example, by passing a fluid through or across the article. The ceramic precursor article forms a porous ceramic article after firing as previously described. The fluid includes a passivator, and can also include a carrier fluid. The fluid can be at a first temperature which is higher than a second temperature of the green ware. The temperature difference is sufficient for condensation of at least a portion of the fluid. The carrier fluid can be any solvent for the passivator but is preferably a gas, such as air or water vapor. The passivator can include, for example, an organic solid or liquid, for example, glycerin, an unsaturated or condensable monomer, an oligomer, or a polymer.

In exemplary embodiments, the solution can include a fluid comprising a discontinuous phase of passivator suspended in a carrier fluid comprising a gas or liquid. Particles of the discontinuous phase are generally small, that is, less than about 5 microns in diameter. The carrier fluid can form a solution with the passivator. The passivator can include any material that can form a thin layer on the green ware upon condensation, and can include any liquid or solid provided the passivator is capable of being transported by the fluid and volatized at elevated temperatures to allow the membrane layer, plugging material and/or skin material to bond to the substrate.

In exemplary embodiments, the fluid can comprise a carrier fluid solvent and a solute of the dissolved passivator. The carrier fluid solvent can include a gas, such as air, an inert gas or water vapor, and the passivator includes an evaporable liquid such as glycol ester. The gas passes over the evaporable liquid so that at least a portion of the evaporable liquid will evaporate into the gas to form a solution, that is, the fluid. Preferably, the gas can be heated to facilitate evaporation of the evaporable liquid. The heated solution is directed to and circulated through the unfired, extruded and dried ceramic precursor article. The green ware can be at least initially cooler than the warm or heated solution. Contact of the heated solution with the cool green ware causes at least a portion of the passivator to fall out of solution and deposit on the green ware. Advantageously, the solution heats up the green ware to limit the amount of passivator that will collect on the green ware.

The fluid can include, for example, a heated gas and the passivator can include, for example, a polymer. Examples of the heated gas and the passivator include water vapor and a methylcellulose ether polymer. The heated gas can be at a first higher temperature. The heated gas can pass over and absorb the polymer. The gas may become saturated with the polymer but typically the amount of polymer in the gas is less than about 1 wt. %. The polymer-containing gas can pass through an unfired, extruded and dried ceramic precursor article (green ware). The green ware can be initially at a second lower temperature. The first higher temperature is initially higher than the second lower temperature. As the heated, polymer-containing gas contacts the cooler green ware, the polymer condenses on the greenware. The heated gas eventually heats the green ware, to a temperature that does not favor condensation. Until the non-condensing temperature is reached, the green ware will accumulate a small amount of polymer, generally less than about 1 wt % of the total green ware composition. Alternatively, the condensing process can be stopped before the non-condensing temperature is reached to deposit a smaller amount of polymer. For example, the green ware may accumulate, less than 0.1 wt % of polymer, less than 0.01 wt %, less than 0.001 wt %, less than 0.0001 wt %, or even less than 0.00001 wt %. The amount of polymer can form a thin layer as described herein from nanometer thickness to millimeter thickness. The polymer may form a continuous thin layer or a discontinuous thin layer. Such a discontinuous thin layer may comprise openings or be configured much like a net that provides an adequate barrier to provide a degree of protection to the green binder from solvents during post processing. The green ware can be removed from the heated gas, dried, and cured.

In exemplary embodiments, the passivator can include a chemically reactive compound, such as a monomer, oligomer or polymer precursor. The reactive compound may require one or more components. The reactive compound can include a component that polymerizes in the presence of an initiator. The initiator can be another compound or can be electromagnetic radiation, electron beam, heat, or like agents. For example, the passivator can include a monomer that is initiated with ultraviolet radiation, that is, a light-sensitive or light-activated initiator. Alternatively, the passivator can include a monomer that is polymerized with a thermal initiator, that is, a heat-sensitive or heat-activated initiator. Fourier Transform Infrared (FTIR) spectroscopy analysis results indicate complete cure of the reactive compound can occur in as little as 10 to 45 minutes at 100° C.

In exemplary embodiments, the method of the disclosure can include generating a fluid comprising a reactive compound. The compound can be polymerizable or co-polymerizable. The reactive compound can include, for example, at least a first reactive component such as a monomer, an oligomer, or a low molecular weight polymer. The fluid circulates through the green ware, and some of the reactive compound condenses on the green ware surfaces. The first reactive component can react to passivate the green ware. In an optional second step, a second fluid comprising a second reactive component can be circulated through the green ware after condensation of the first reactive component from the first fluid. The second reactive component can be selected to react with the first reactive component to form a polymer thin layer that protects the binder material of the green ware.

In exemplary embodiments, a passivator can comprise a component that undergoes polymerization during or after condensation. Examples include polymers and copolymers of urethane, epoxy, urea-formaldehyde, vinyl, alkoxysilane, oxetane, aziridine, phenolics, vinyl ethers, vinyl esters, acrylates, methacrylates, acrylamides, styryls, allyls, vinyl amide, vinyl amines, maleimides, maleates, itaconates, crotonates, anhydrides, and like monomers, or combinations thereof. Alternative or additional polymer types and chemistries can include, for example, polyester, polyamide, polyimide, polyether, carbodiimide, or like polymers, and combinations thereof. In exemplary embodiments, the passivator can include, for example, an epoxy polymer formed from an organic diamine and an organic ether, such as an alkylene glycol diamine and an alkylene glycol diglycidyl ether. Other examples of polymerizable materials besides acrylates that can be used in this application are, but are not limited to, methacrylates, vinyls, acrylamides, epoxies, maleimides, vinyl ethers, maleates, vinyl esters, allyls, oxetanes, vinyl amides, propargyls, unsaturated polyesters, styryls, alkynyls, itaconates, crotanates, and propenyl ethers.

In exemplary embodiments, the passivator, such as a polymerizable or crosslinkable component, can use a thermal or radiation-sensitive initiator. The initiator can be transported to the reactive compound after the reactive compound has condensed on the green ware. Alternatively, the initiator can be condensed before the reactive compound, simultaneously with the reactive compound, or the initiator and reactive compound may be mixed together and then condensed onto the green ware.

Figure 3:
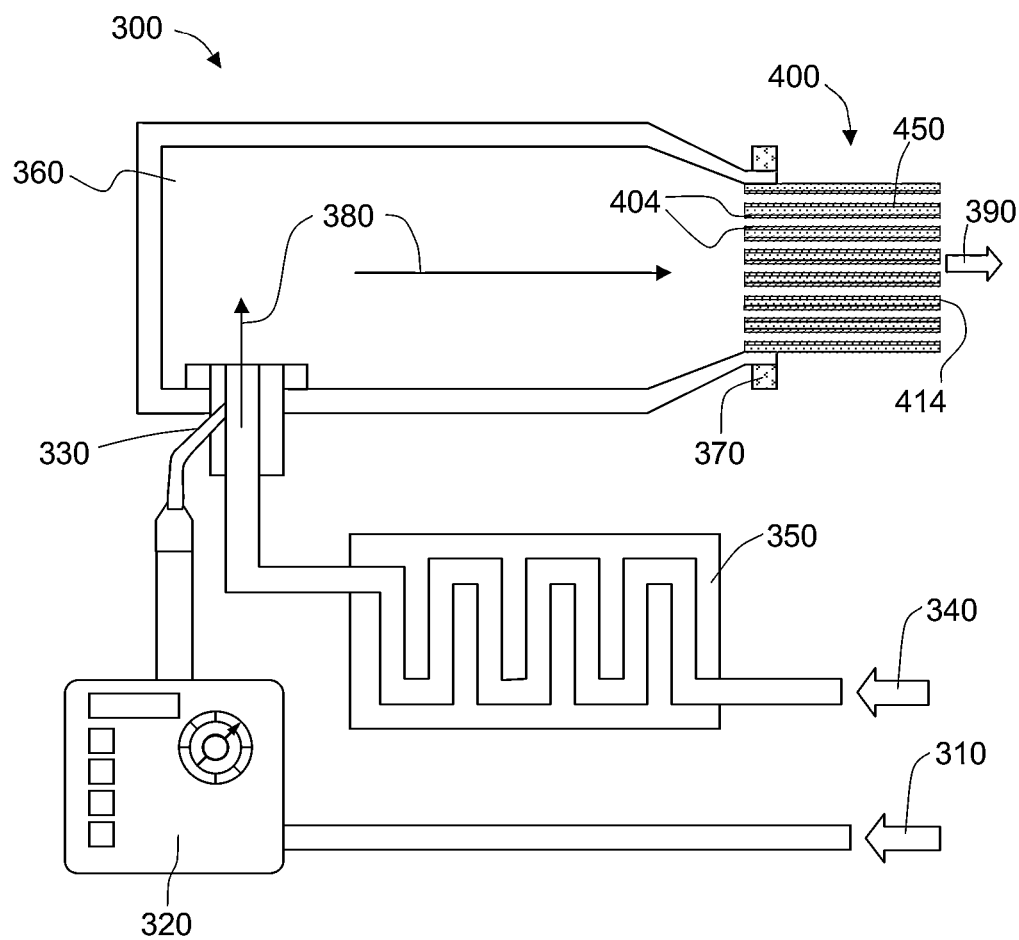
FIG. 3 is a block diagram of an apparatus to deposit the thin layer on the green ware according to an exemplary embodiment of the disclosure.

FIG. 3 shows, in exemplary embodiments, an apparatus useful for depositing a thin layer on a surface of the green ware with a fluid comprising one or more reactive components. The reactive components can react to form the thin layer. The apparatus 300 includes a carrier gas 310, an atomizer controller 320, an atomizer (or aerosolizer) 330, a reactive component supply 340, a water bath 350, a misting chamber 360, and a holder 370. The holder secures, such as by containing, the green ware 400. The atomizer controller 320 pumps the fluid comprising a reactive component through the aerosolizer such as atomizer 330 to form an aerosol such as a mist. Alternatively, misting may be understood to be a process that generates an aerosol, vapor, fog, mist, smoke, or combinations thereof. The aerosol can comprise the reactive component and a carrier fluid. Alternatively, the aerosol can consist essentially of the reactive component if the neat reactive component can be formed into an aerosol. The misting chamber 360 may include a fan to move the aerosol in the direction of arrows 380 to the holder 370 and through and/or around the green ware 400.

The reactive component condenses or coalesces on surfaces such as walls 450 of the green body to form the thin layer 404. The aerosol may flow out of the green ware through an outlet face 414 to be recirculated or captured for further processing and/or for disposal. The holder 370 may position the green ware 400 so that the channels and surfaces, such as walls 450 of the green body, are horizontal as shown in FIG. 3. The inventors discovered surprisingly that such an orientation assisted the deposition (condensation or coalescence) of components of the aerosol, vapor, fog, mist, smoke, etc., or combinations thereof onto the channels and surfaces of the green body 400 to form the thin layer 404.

Prior to coating and/or treating channels of the green cellular ceramic body with the slurry, one or more of the plurality of channels may be masked such that the slurry and/or thin layer is coated only on the channel or channels that are not masked. For example, in one set of preferred embodiments, channels intended to be plugged as outlet channels may be masked prior to coating the slurry such that slurry is coated only on channels intended to be plugged as inlet channels. Alternatively, channels intended to be plugged as inlet channels may be masked prior to coating the slurry such that slurry is coated only on channels intended to be plugged as outlet channels. In addition, channels may be masked such that different slurry compositions are coated on different channels and/or different amounts of slurry compositions are coated on different channels.

Additionally, substrates may need to be plugged to create a flow path through the walls to allow particle filtration to occur or skinned to meet dimensional tolerances or physical property requirements. The vast majority of post processing of extruded ceramics whether it is membrane coating, plugging, skinning, or other processing steps are done utilizing fired extruded substrates. In most cases this then requires additional firing steps to complete the process.

Green (dried but unfired) processing has the advantage of allowing a single firing to complete the membrane, plugging, skinning, or other post processing step without the need for subsequent high temperature firings to assure membrane, plug, and skin properties meet the application demands. Additionally since green modulus of rupture (MOR) is often greater than fired MOR values green processing can result in fewer chips during processing. However, green processing can be challenging since binders utilized during the extrusion process are soluble in water and tend to result in substrate damage if water is used during the green post processing step. For example, green plugging utilizing aqueous based cement without the thin layer to protect the green ware can result in substrate cracking.

Figure 4:
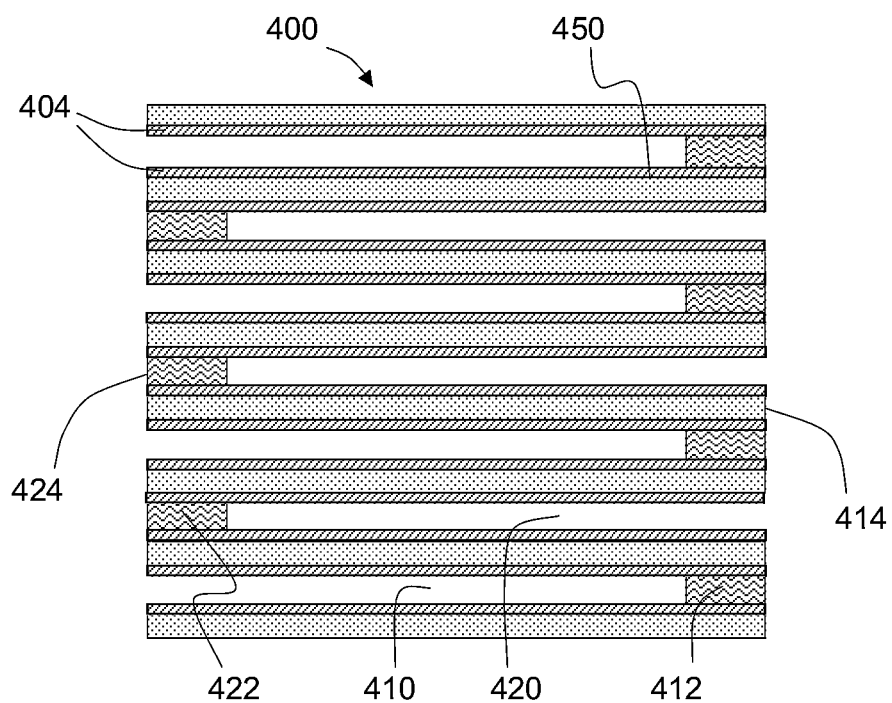
FIG. 4 illustrates a cross-sectional representation of an unfired wall-flow filter structure of ceramic precursor material (green ware) including green plugging composition in the channels of the green ware treated with a thin layer according to exemplary embodiments of the disclosure.

FIG. 4 illustrates a cross-sectional representation of an unfired wall-flow filter precursor structure including green plugging composition in the channels of green ware treated with a thin layer according to exemplary embodiments of the disclosure. The green ware body may be formed by extrusion and drying a ceramic precursor composition, having channels or cells traversing a honeycomb body 400, a first subset of channels or cells (i.e., "inlet channels") 410 to be sealed or plugged 412 at a first or outlet end face 414 of the honeycomb and the remaining channels or cells (i.e., "outlet channels") 420 being sealed or plugged 422 at a second or opposing inlet end face 424 thereof. Following an extrusion step and a drying step, the unplugged green ware cellular body 400 may be treated as described herein to deposit a thin layer 404 on channel walls 450. The inlet channels 410 may be plugged 412 on the first end 414 and/or the outlet channels 420 may be plugged 422 on the second end 424 with a green plugging material comprising a liquid vehicle to form a fully or partially plugged green ware cellular body. The plugged green ware cellular body is then fired at high temperatures (e.g., above 1000° C.) to volatilize the thin layer and form a plugged ceramic article 100 (FIG. 1).

Figure 5A:
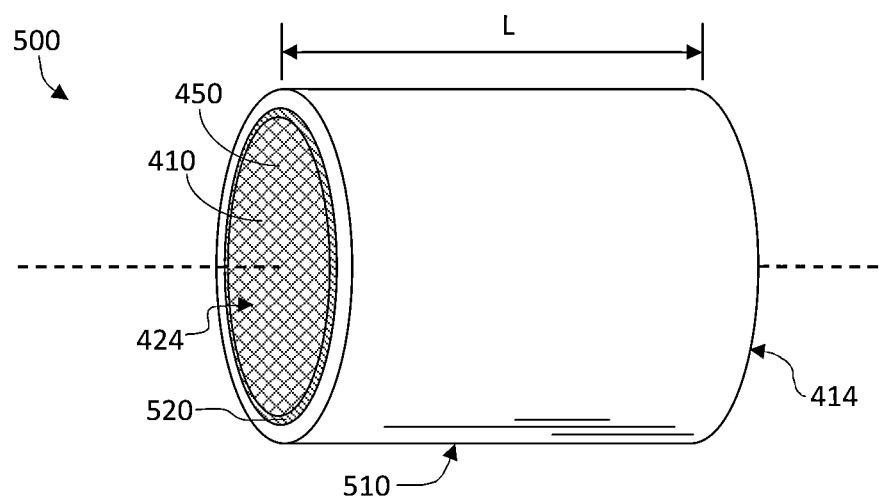
FIGS. 5A and 5B illustrate an unfired wall-flow filter structure of ceramic precursor material (green ware) including a green skin composition on the axial periphery of the green ware treated with a thin layer according to exemplary embodiments of the disclosure.
Figure 5B:
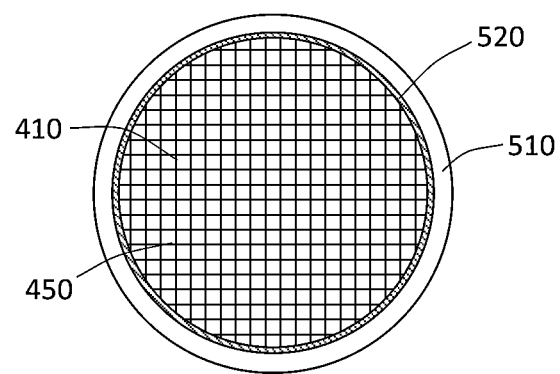

FIGS. 5A and 5B illustrate an unfired wall-flow filter precursor structure 500 including a green skin composition 510 on the axial periphery of green ware treated with a thin layer 520 according to exemplary embodiments of the disclosure. In FIGS. 5A and 5B a radially outermost area of the green ware cellular body may be contoured in accordance with a predetermined dimensional specification and a green skin material 510 applied to the radially outermost area of the green ware cellular body 500. In this exemplary embodiment, after the contouring step, prior to the skinning step, the thin layer 520 may be applied to the radially outermost area of the green ware cellular body 500 according to exemplary embodiments of the present disclosure. In this exemplary embodiment, prior to the contouring step, green cellular ceramic bodies can be extruded to a size slightly larger than desired but in a manner that enables high web quality, even if the webs are thin. This can enable tight dimensional control without special demand or attention during the initial forming process. The green skin material 510 applied after the contouring step can be the same or different than the green ware cellular body and can also be the same or different than the green plugging material. Material removed as a result of contouring a radially outermost area of the green cellular ceramic body can be recycled to provide material for providing other green ware cellular bodies.

In one set of exemplary embodiments, the green cellular ceramic body and the green plugging and/or green skinning composition can have the same or essentially the same ingredients. In another set of exemplary embodiments, the green cellular ceramic body and the green plugging and/or green skinning composition can have at least some different ingredients. For example, green plugging material will generally comprise a composition that forms a channel seal. In yet another set of exemplary embodiments, the green plugging and/or green skinning composition can comprise two or more different compositions. For example, the green skinning composition may comprise a first skinning composition having the same or essentially the same ingredients as the green cellular ceramic body and a second coating composition having at least some different ingredients than the green cellular ceramic body. Alternatively, the green skinning composition may comprise two or more skinning compositions that each have at least some different ingredients than the green cellular ceramic body. The two or more skinning compositions may be coated on the outermost radial (peripheral) surface of the green cellular ceramic body, such as a first skinning composition on the outermost radial surface of the green cellular ceramic body and a second skinning composition on the first skinning composition.

These green plugging and/or green skinning compositions may be applied to form plugs, artificial skin (otherwise referred to as after-applied skin), or even to bond several smaller green honeycomb segments together to make a larger green honeycomb article. To that end, a conventional material composition can consist of one or more ceramic powders, a liquid vehicle such as water, a water soluble polymer, typically methylcellulose, and an inorganic binder, although an inorganic binder may not be required in all aspects. The water and methylcellulose control the rheology of the paste and the ceramic powder and the inorganic binder when present may react to provides strength after the water and methylcellulose is removed during firing with the substrate. The green honeycomb structures may be plugged and/or skinned before firing with a paste having the same or similar composition to that of the green body, using appropriate amounts of a liquid phase to impart a workable viscosity, optionally with the addition of binders and plasticizers. The binder of the green honeycomb structures treated to have the thin polymer layer disposed on the green honeycomb exterior and interior surfaces is resistant to dissolution by the liquid phase. The treated and processed green honeycomb structure can be fired to result in a porous ceramic honeycomb plugged and skinned filter or skinned substrate.

The green plugging and skinning material includes a liquid vehicle. In certain exemplary embodiments, the binder material in the green cellular ceramic bodies is insoluble in the liquid vehicle in the green plugging and skinning material. In certain exemplary embodiments, the binder material in the green cellular ceramic bodies is partially soluble in the liquid vehicle in the green plugging and skinning material. In certain exemplary embodiments, the binder material in the green cellular ceramic bodies is completely soluble in the liquid vehicle in the green plugging and skinning material.

In certain exemplary embodiments, the liquid vehicle can include or be selected from at least one component selected from the group consisting of oils, water, water soluble or insoluble fatty acids, water soluble or insoluble alcohols, water soluble or insoluble ethers, water soluble or insoluble esters, water soluble or insoluble aldehydes, and water soluble or insoluble ketones. Examples of liquid vehicle constituents include those containing substituted or unsubstituted, linear or branched, and saturated or unsaturated aliphatic chains, such as those having at least 8 carbon atoms. Liquid vehicle constituents may also contain aromatic groups or substituents.

In exemplary embodiments disclosed herein, the green plugging and skinning materials can include at least one material that upon firing reacts to form at least one material selected from the group consisting of aluminum titanate (AT), metals, intermetallics, mullite, cordierite, alumina ($Al_2O_3$), silicon carbide (SiC), silicon nitride ($Si_3N_4$), silicon aluminum oxynitride (SiAlON), and zeolites.

At least one of these materials can include one or more inorganic ceramic-forming ingredients. The inorganic ceramic-forming ingredients may be the same or different as the inorganic ceramic-forming ingredients used to make green cellular ceramic bodies disclosed herein. Such materials can include synthetically produced materials such as oxides, hydroxides, etc., or they may be naturally occurring minerals such as clays, talcs, or any combination of these. Embodiments disclosed herein are not limited to the types of powders or raw materials. These may be chosen depending on the properties desired in the plugs and skin.

In certain exemplary embodiments disclosed herein, the green plugging and skinning material can react upon firing to form the same general type of material as the type of material the green cellular ceramic body forms as a result of firing. For example, in certain exemplary embodiments, both the green plugging and skinning material and the green cellular ceramic body can form aluminum titanate (AT) as a result of firing. Alternatively, both the green plugging and skinning material and the green cellular ceramic body can form cordierite as a result of firing.

In other exemplary embodiments, the green plugging and skinning material and the green cellular ceramic body can form a different general type of material as a result of firing. For example, the green cellular ceramic body may form aluminum titanate (AT) as a result of firing, whereas the green plugging and skinning material may form cordierite as a result of firing. Also, the green plugging material and skinning material can form a different general type of material as a result of firing. For example, the green plugging material may form aluminum titanate (AT) as a result of firing, whereas the green skinning material may form cordierite as a result of firing.

The plugged and/or skinned green cellular ceramic bodies may then be fired. The firing conditions of temperature and time may depend on the composition and size and geometry of the body, and embodiments herein are not limited to specific firing temperatures and times. For example, in compositions which are primarily for forming cordierite, the temperatures may be from about 1300° C. to about 1450° C., and the holding times at these temperatures may be from about 1 hour to about 10 hours. For mixtures that are primarily for forming mullite, the temperatures may be from about 1300° C. to about 1650° C., and the holding times at these temperatures may be from about 1 hour to about 24 hours. For cordierite-mullite forming mixtures which yield the previously described cordierite-mullite compositions, the temperatures may be from about 1300° C. to about 1650° C. For mixtures that are primarily for forming aluminum titanate (AT), the temperatures may be from about 1350° C. to about 1500° C. and the holding times at these temperatures may be from about 5 hours to about 24 hours. Firing times depend on factors such as kinds and amounts of materials and nature of equipment but typical total firing times may be from about 20 hours to about 250 hours. For metal bodies, the temperatures may be about 1000° C. to 1400° C. in a reducing atmosphere preferably hydrogen. Firing times depend on factors as discussed above but may be at least 2 hours. For zeolite bodies, the temperatures may be about 400° C. to 1000° C. in air. Firing times depend on factors as discussed above but may be at least 2 hours.

FIG. 6A is a schematic flow chart diagram of a method for applying a coating to green ware as disclosed in U.S. Patent Application No. 2012/0047860, the contents of which is hereby incorporated as if fully set forth in its entirety. FIG. 6B is a schematic flow chart diagram of a method for applying a coating to treated green ware according to an exemplary embodiment of the disclosure. Applying a coating is illustrated in FIGS. 6A and 6B as exemplary, however similar processes can be used to apply plugs and/or skinning.

In FIG. 6A a green and dried substrate 600 with or without masked channels may be coated with a slurry at operation 602. In this case the slurry preparation 604 includes a liquid vehicle that does not dissolve the green body binder. The slurry includes the non-aqueous solvent 608 and the other inorganic materials and pore former 606. In operation 610 a special drying process may be followed to handle and recover the non-aqueous solvent 612. Operation 614 denotes firing and operation 616 indicates final finishing procedures. Final finishing procedures 616 may include cold set plugging and/or skinning in the case of applying a membrane, wash coating, catalyzing, and the like.

In FIG. 6B a green and dried substrate 600 may be treated to deposit a thin layer coating 620. In operation 622 the treated green substrate with or without masked channels may be coated with a slurry at operation 622. In this case operation 622 is significantly different than operation 602 in FIG. 6A because the slurry may or may not include a liquid vehicle in which the green body binder is soluble. The slurry preparation 624 includes an aqueous solvent 626 such as water, and the other inorganic materials and pore former 606. In operation 628 no special drying process is required to handle and recover the aqueous solvent 626. Operation 614 denotes firing and operation 616 indicates final finishing procedures. Final finishing procedures 616 may include cold set plugging and/or skinning in the case of applying a membrane, wash coating, catalyzing, and the like. Accordingly, the processes according to exemplary embodiments of the disclosure eliminate the need for expensive and complex coating and drying equipment that would be required for non-aqueous processing.

EXAMPLES

The disclosure and scope of the appended claims will be further clarified by the following examples, which are included to provide a further understanding of the claimed invention, illustrate exemplary embodiments of the disclosure, and together with the description serve to explain the principles of the claimed invention. However, it is to be understood that these examples are exemplary and explanatory and are not intended to limit the disclosure or the claims to the materials, processes, and articles of these specific examples.

Table 1 presents example green dried specimens treated to dispose an exemplary embodiment of the thin layer according to exemplary embodiments as disclosed herein. As an exemplary embodiment of the viability of the disclosed process, the following experiment was completed. Samples of 2 inch (5.08 cm)×6 inch (15.24 cm) core drilled green aluminum-titanate (AT) having 300 cells per square inch (CPSI) and wall thickness of 13 mils (0.33 mm), that is, 300/13, asymmetric cell technology (ACT) substrates were exposed to an acrylate mist (e.g., 99 wt % Ditrimethylolpropane Tetraacrylate® by SARTOMER and 1% irgastab uv 22® by BASF) in order to render the AT precursor material hydrophobic and protect the material from attack due to exposure to water. FIG. 3 shows a schematic of the unit used to mist the green AT substrates. A TSI® atomizer 330 was utilized to generate the mist at 65-70° C. although other methods are possible. The mist is then carried through a chamber 360 and flowed through the unplugged green substrate 400 where the acrylate material is deposited on the channel walls 450. The mist was flowed through the unplugged green substrate 400 from a first direction, for example, from inlet face end 424 to outlet face end 414 (FIG. 4) and then from a second direction, for example from outlet face end 414 to inlet face end 424. Table 1 presents the details of the treatment for each green substrate example evaluated.

TABLE 1

| Samples Description | Sample ID | Mist Time |
|---|---|---|
| 2 × 6 green AT3 300/13 ACT substrate | A | 20 minutes total (10 minutes each direction) |
| 2 × 6 green AT3 300/13 ACT substrate | B | 30 minutes (15 minutes each side) |
| 2 × 6 green AT3 300/13 ACT substrate | C | 10 minutes total (5 minutes each side) |

After treatment the substrates were cured in a box oven at 150° C. for 4 hours. Higher rate misting and curing methods have been applied however, the results are not presented here. Following the treatment the parts had no appreciable weight gain.

In order to evaluate the effectiveness of the treatment at protecting the substrate from water, samples were cut to about 1 inch (2.54 cm) long and evaluated as follows. For each treatment mist time A, B, C one sample was exposed to water by pouring water through the part to simulate a waterfall type coating process A-p, B-p, C-p. The parts were allowed to air dry at ambient conditions and observations were made to look for damage to the substrate, for example deformation or cracking. The second test was more aggressive, the samples were soaked in water for greater than 30 minutes and then allowed to air dry, again at ambient conditions A-s, B-s, C-s. The samples were observed for damage due to soaking in water. For both experiments a control green AT3 substrate D that was not misted was also evaluated for comparison. FIGS. 7-11 show the Examples A-s, A-p, B-s, B-p, C-s, C-p, D-s, D-p following water exposure.

Figure 7:
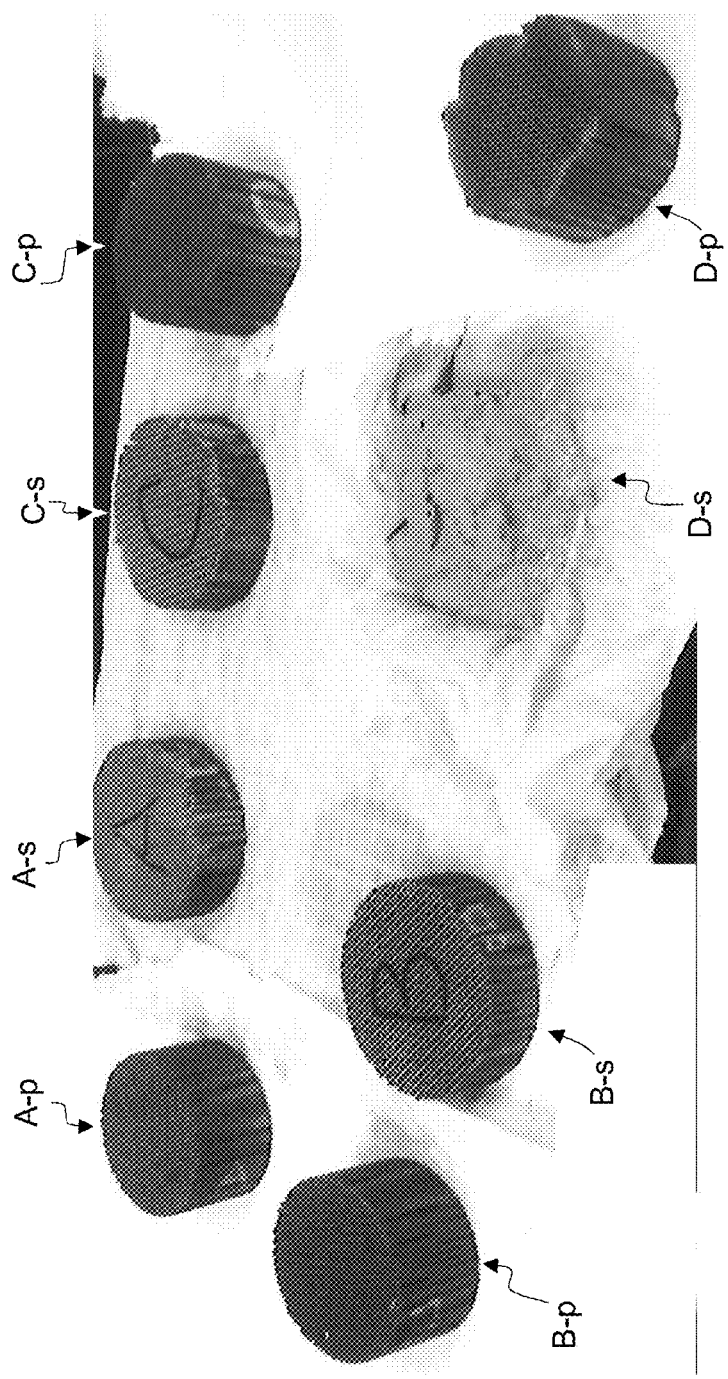
FIG. 7 is a photograph of samples of extruded and dried ceramic precursor material formed in wall-flow filter structures where three sets of samples have been treated with a thin layer according to exemplary embodiments of the disclosure compared to an untreated sample when subsequently exposed to water.
Figure 8:
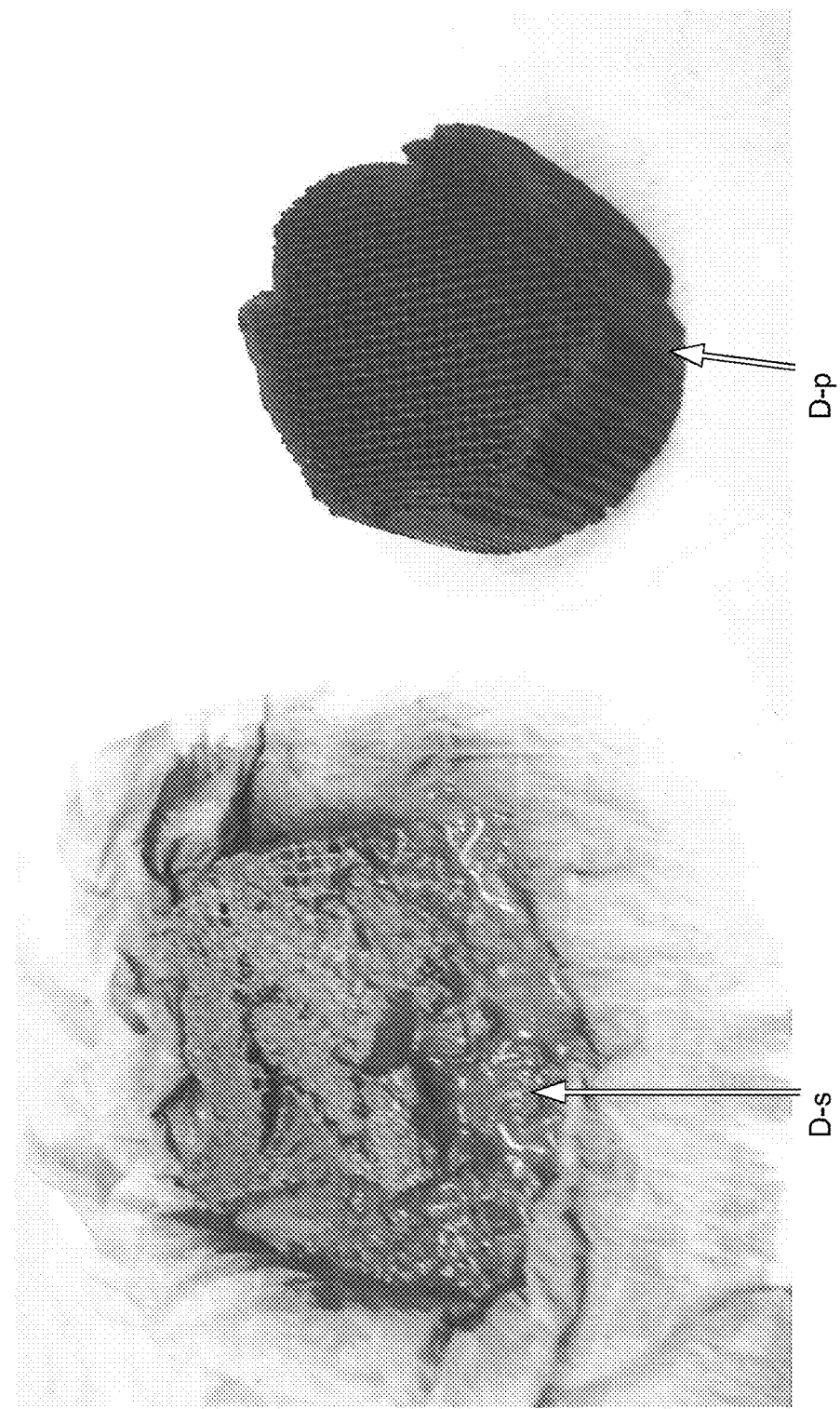
FIG. 8 is a photograph of the untreated samples of FIG. 7 showing significant damage due to the solubility of the green ware binder in water.
Figure 10:
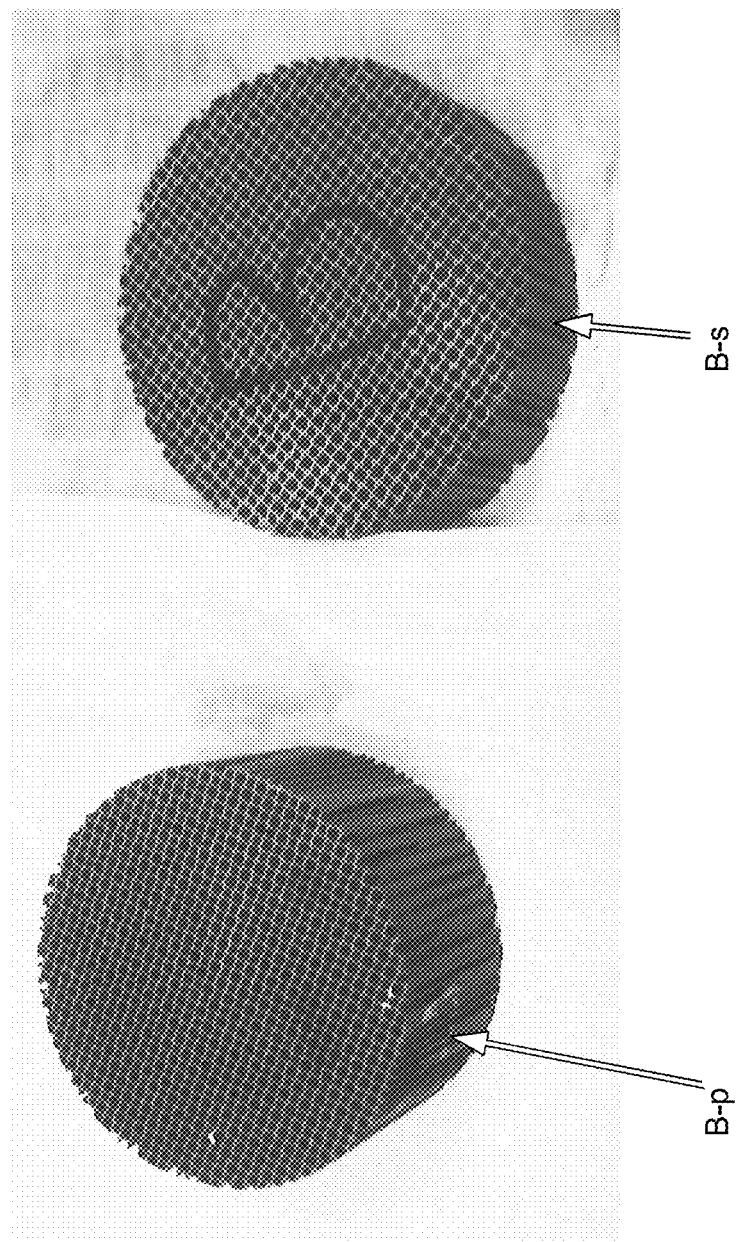
FIG. 10 is a photograph of the samples of FIG. 7 treated for 30 minutes to form a thin layer according to exemplary embodiments of the disclosure showing very slight to no damage when subsequently exposed to water.
Figure 11:
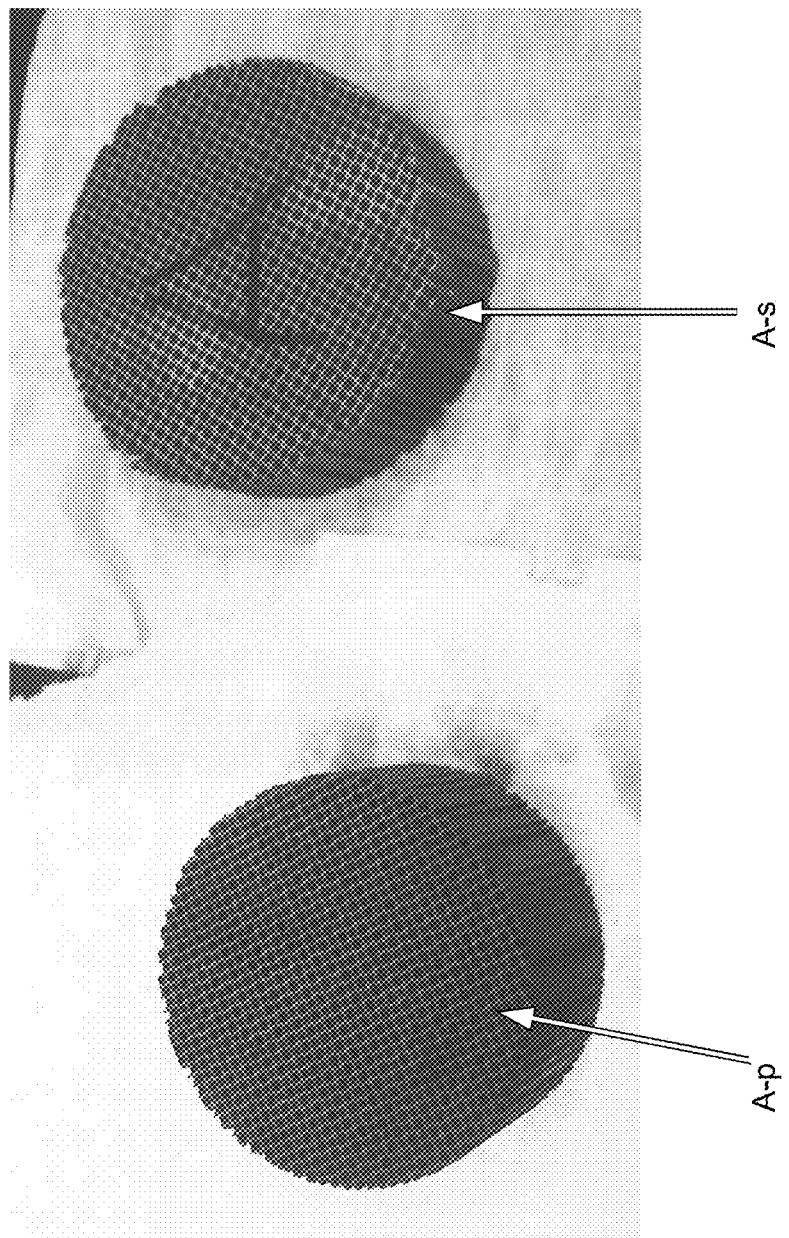
FIG. 11 is a photograph of the samples of FIG. 7 treated for 20 minutes to form a thin layer according to exemplary embodiments of the disclosure showing substantially no damage when subsequently exposed to water.

FIG. 7 is a photograph of the Examples A-s, A-p, B-s, B-p, C-s, C-p, D-s, D-p of extruded and dried AT precursor material formed in wall-flow filter structures where the Examples A-s, A-p, B-s, B-p, C-s, C-p have been treated with a thin layer according to exemplary embodiments of the disclosure compared to an untreated Example D-s, D-p when subsequently exposed to water. As can clearly be seen by observation of FIG. 8, the Comparison Example D-s, D-p showed significant deformation when exposure to water using both test approaches. The soaked filter D-s was catastrophically damaged losing all geometric structure due to water exposure due to the solubility of the green ware binder in water. In contrast, none of the misted Examples A-s, A-p, B-s, B-p, C-s, C-p in FIGS. 9-11 showed any damage due to the pouring of water through the part to simulate aqueous coating.

Figure 9:
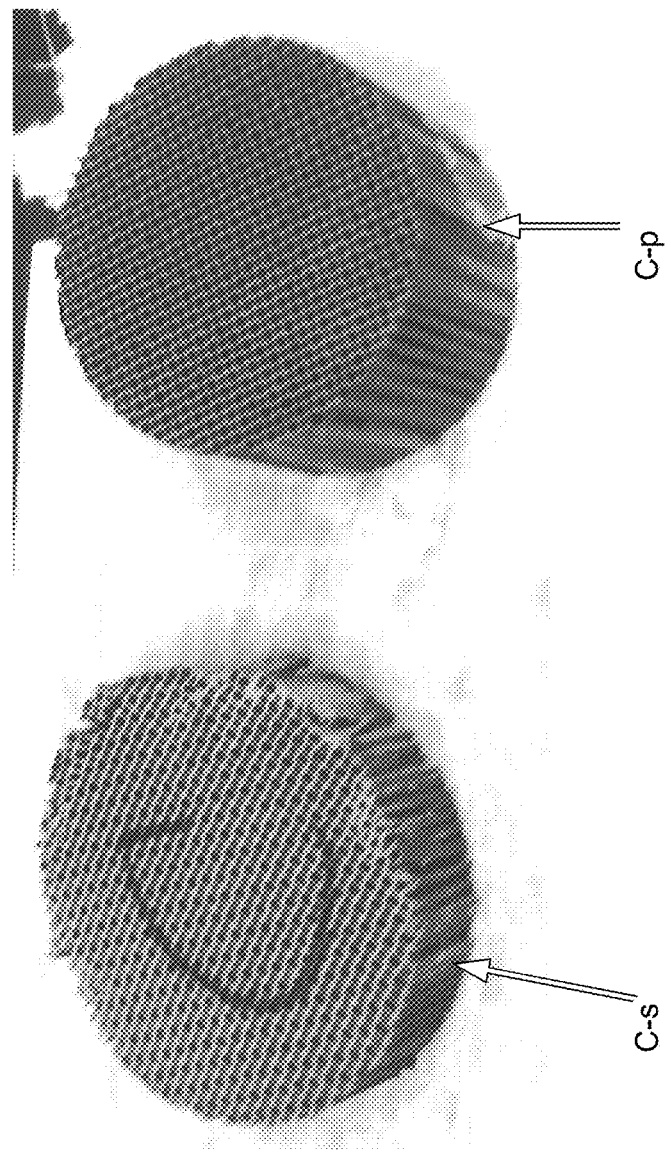
FIG. 9 is a photograph of the samples of FIG. 7 treated for 10 minutes to form a thin layer according to exemplary embodiments of the disclosure showing slight to no damage when subsequently exposed to water.

FIG. 9 is a photograph of the Examples C-s, C-p of FIG. 7 treated for 10 minutes to form a thin layer according to exemplary embodiments of the disclosure showing slight to no damage when subsequently exposed to water. FIG. 10 is a photograph of the Examples B-p, B-s of FIG. 7 treated for 30 minutes to form a thin layer according to exemplary embodiments of the disclosure showing very slight to no damage when subsequently exposed to water. FIG. 11 is a photograph of the Examples A-p, A-s of FIG. 7 treated for 20 minutes to form a thin layer according to exemplary embodiments of the disclosure showing substantially no damage when subsequently exposed to water. In the more severe tests where samples were soaked for greater than 30 minutes in water some damage, shape distortion and cracking, was observed on misted Examples A-s and C-s which had the shorter misting times. The level of damage was inversely proportional to the misting duration and corresponding level of polymer deposited. That is, the Example C-s misted for the shortest period of time showed the most damage and the intermediate misting duration Example A-s exhibited slight damage. None of the greater than 30 minute water soaked misted Examples A-s, B-s, C-s, were damaged to the same extent as the Comparison Example D-p, that had water poured through the part. As demonstrated, exemplary embodiments of the disclosed teachings can be utilized to protect green substrates from exposure to water, even for extended periods of time.

Thus, exemplary embodiments of the disclosure enable cost-effective aqueous processing of green substrates, reducing the need to use expensive and potentially volatile non-aqueous liquid vehicles that may require special handling and recovery units.

Exemplary embodiments of the disclosure enable application of aqueous-based coatings, plugging, and skinning without incurring substrate damage due to dissolution of water soluble extrusion binders.

Exemplary embodiments of the disclosure enable the use of multiple aqueous treatment steps to apply multiple coatings or allow for multiple processes prior to final heat treatment/firing.

Exemplary embodiments of the disclosure enable variation of local hydrophilic and hydrophobic properties through application of the hydrophobic treatment locally as needed to enable green processing; for example treatment of the outside of a substrate for skinning or one or both ends for green plugging prior to final heat treatment/firing.

Exemplary embodiments of the disclosure enable green substrates to be chemically treated, the chemical treatment cured as required, and processed as needed to complete the required process step (examples include membrane coated, plugged and/or skinned) followed by a single firing step to mature the substrate as well as the membrane coating, plugs, and/or skin. Exemplary embodiments of the disclosure provide additional advantages attributed to green processing in general including improved membrane, plug, and skin attributes due to high temperature firing. These attributes include higher strength for plugs that enables shorter plug lengths for a given push out strength, enhanced adhesion to the substrate, and coefficient of thermal expansion (CTE) matching to the substrate when compositions matching the substrate are utilized.

Although applying the hydrophobic treatment via misting is not required, the use of misting to apply the hydrophobic treatment according to exemplary embodiments of the disclosure allows the use of neat chemical avoiding the need for a drying step, allowing for rapid curing, and avoiding the potential need for use of a liquid carrier for the hydrophobic treatment that would be compatible with the water soluble substrate binder.

Exemplary embodiments of the disclosure also can be generalized as-needed depending on the solubility of green binders used in the material batch to allow surface chemistry modifications as needed to enable green processing. For example, if oil-soluble binders are used in the material batch, then the green substrate surface could be converted from oleophilic to oleophobic to enable oil-based coatings to be applied. This approach provides a very flexible framework for combining varied binder chemistries with varied coating chemistries.

Reference throughout this specification to exemplary embodiments and similar language throughout this specification may, but do not necessarily, refer to the same embodiment. Furthermore, the described features, structures, or characteristics of the subject matter described herein with reference to an exemplary embodiment may be combined in any suitable manner in one or more exemplary embodiments. In the description, numerous specific details are provided, such as examples of controls, structures, processes, compositions, articles, etc., to provide a thorough understanding of embodiments of the subject matter. One skilled in the relevant art will recognize, however, that the subject matter may be practiced without one or more of the specific details, or with other methods, components, materials, and so forth. In other instances, well-known structures, materials, or operations are not shown or described in detail to avoid obscuring aspects of the disclosed subject matter.

The schematic flow chart diagrams and method schematic diagrams described above are generally set forth as logical flow chart diagrams. As such, the depicted order and labeled steps are indicative of representative embodiments. Other steps and methods may be conceived that are equivalent in function, logic, or effect to one or more steps, or portions thereof, of the methods illustrated in the schematic diagrams. Additionally, the format and symbols employed are provided to explain the logical steps of the schematic diagrams and are understood not to limit the scope of the methods illustrated by the diagrams. Although various arrow types and line types may be employed in the schematic diagrams, they are understood not to limit the scope of the corresponding methods. Indeed, some arrows or other connectors may be used to indicate only the logical flow of a method. For instance, an arrow may indicate a waiting or monitoring period of unspecified duration between enumerated steps of a depicted method. Additionally, the order in which a particular method occurs may or may not strictly adhere to the order of the corresponding steps shown.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method of manufacturing a cellular ceramic article, comprising:
providing a green cellular ceramic body comprising a binder material and a plurality of channels;
exposing a surface of the green cellular ceramic body to a fluid to deposit at least a portion of the fluid on the surface;
polymerizing the deposited fluid to form a polymer thin layer on the surface; and
post processing the surface of the green cellular ceramic body with a green processing composition and a solvent to form a green component on the polymer thin layer, wherein the binder material is soluble in the solvent.

2. The method of claim 1, wherein the post processing comprises at least one of:
coating, the green processing composition comprises a green coating composition and the green component comprises a green coating layer;
plugging, the green processing composition comprises a green plugging composition and the green component comprises a green plug; and
skinning, the green processing composition comprises a green skinning composition and the green component comprises a green skinning layer.

3. The method of claim 1, wherein the fluid comprises the polymer and a carrier fluid.

4. The method of claim 1, wherein the fluid comprises a reactive compound that forms a polymer.

5. The method of claim 4, wherein the reactive compound that forms a polymer is selected from the group consisting of polymers and copolymers of: urethane, epoxy, urea-formaldehyde, vinyl, alkoxysilane, oxetane, aziridine, phenolics, vinyl ether, vinyl ester, acrylate, methacrylate, acrylamide, styryl, allyl, vinyl amide, maleimide, maleate, itaconate, crotonate, anhydride, polyester, polyamide, polyether, carboiimide, and combinations thereof.

6. The method of claim 5, wherein the reactive compound that forms a polymer comprises an acrylate.

7. The method of claim 6, wherein the acrylate comprises ditrimethylolpropane tetraacrylate.

8. The method of claim 4, wherein the reactive compound comprises a first reactive component and a second reactive component that can react with the first reactive component to form the polymer.

9. The method of claim 8, wherein the first reactive component comprises an organic diamine and the second reactive component comprises an organic ether.

10. The method of claim 9, wherein the first reactive component comprises alkylene glycol diamine and the second reactive component comprises alkylene glycol diglycidyl ether.

11. The method of claim 8, wherein the reactive compound comprises a reactive component that forms a polymer and an initiator.

12. The method of claim 8, wherein exposing the surface of the green cellular ceramic body to the fluid comprises exposing the surface to the first reactive component and then exposing the surface to the second reactive component.

13. The method of claim 1, further comprising heating the fluid before the surface of the green cellular ceramic body is exposed to the fluid and the fluid is a vapor which condenses on interior channel walls of the green cellular ceramic body.

14. The method of claim 13, wherein when the condensed fluid polymerizes, it coalesces to form a continuous polymeric layer on the interior walls of the green cellular ceramic body.

15. The method of claim 1, wherein the green cellular ceramic body comprises at least one material that upon firing reacts to form at least one material selected from the group consisting of aluminum titanate (AT), metals, intermetallics, mullite, cordierite, alumina ($Al_2O_3$), silicon carbide (SiC), silicon nitride ($Si_3N_4$), silicon aluminum oxynitride (SiAlON), and zeolites.

16. The method of claim 1, wherein the binder material comprises at least one cellulose ether.

17. The method of claim 1, wherein the green processing composition comprises at least one material that upon firing reacts to form at least one material selected from the group consisting of: aluminum titanate (AT), metals, intermetallics, mullite, cordierite, alumina ($Al_2O_3$), zircon, alkali and alkaline earth alumino-silicates, spinels, perovskites, zirconia, ceria, silicon carbide (SiC), silicon nitride ($Si_3N_4$), silicon aluminum oxynitride (SiAlON), and zeolites.

18. The method of claim 1, wherein the surface comprises at least one of a channel wall surface and a radially outermost area of the green cellular ceramic body.

19. The method of claim 1, wherein the method further comprises contouring a radially outermost area of the green cellular ceramic body in accordance with a predetermined dimensional specification; and
applying a green skinning composition to the radially outermost area of the green cellular ceramic body.

20. The method of claim 1, wherein the solvent comprises at least one of an oil, an alcohol, and water.

* * * * *